United States Patent [19]

Simpson et al.

[11] Patent Number: 5,338,090
[45] Date of Patent: Aug. 16, 1994

[54] LEG STRUCTURE OF SEAT FOR ABSORBING IMPACT ENERGY

[75] Inventors: Leslie J. Simpson, Chesham Bois; Brian S. Bayliss, Jobec, both of England

[73] Assignee: Koito Industries, Ltd., Kanagawa, Japan

[21] Appl. No.: 955,728

[22] PCT Filed: May 1, 1992

[86] PCT No.: PCT/JP92/00576

§ 371 Date: Dec. 21, 1992

§ 102(e) Date: Dec. 21, 1992

[87] PCT Pub. No.: WO92/19464

PCT Pub. Date: Nov. 12, 1992

[30] Foreign Application Priority Data

May 9, 1991 [JP] Japan ................................. 3-135528

[51] Int. Cl.⁵ ................................................. B60N 2/42
[52] U.S. Cl. ................................................. 297/216.2
[58] Field of Search ............................. 297/216, 216.2

[56] References Cited

U.S. PATENT DOCUMENTS

| | | | |
|---|---|---|---|
| 4,440,441 | 4/1984 | Marrujo et al. | 297/216 |
| 4,718,719 | 1/1988 | Brennan | 297/216 |
| 4,911,381 | 3/1990 | Cannon et al. | 297/216 X |
| 5,152,578 | 10/1992 | Kiguchi | 297/216 |

Primary Examiner—Laurie K. Cranmer
Assistant Examiner—David E. Allred
Attorney, Agent, or Firm—Sughrue, Mion, Zinn, Macpeak & Seas

[57] ABSTRACT

A leg structure wherein a seat bottom (4) and a seat back (5) are mounted on a base frame (3) mounted bridgewise between front and rear beams (1) and (2) to constitute a seat. A diagonal member (8) is extended bridgewise from the front beam (1) supported by a front leg (6) to a lower rearward portion of the seat, a rear leg (9) for supporting the rear beam (2) is supported and fixedly mounted on a substantially intermediate part of the diagonal member (8), and lower end portions of the front leg (6) and the diagonal member (8) are fixed to a floor side rail through fixing fitting members. According to the leg structure, without adding or constituting any special striking energy absorbing device or members, by changing a connecting method of the diagonal member (8) and the leg parts (6) and (9) constructing the leg structure, and by a material characteristic, that is to say, plastic deformation, a striking energy applied to the seat is reduced and dissipated, decreasing the amount of deformation of the seat after the striking energy absorption, and enhancing safety for passengers. This leg structure is utilized as a leg structure of a seat for passengers riding on an aircraft, an automobile or a railway vehicle.

5 Claims, 6 Drawing Sheets

LEG STRUCTURE OF SEAT FOR ABSORBING IMPACT ENERGY

BACKGROUND OF THE INVENTION

1. Technical Field

The present invention relates to a technique for absorbing a striking or impact energy exerted on a seat and particularly to a striking energy absorbing seat leg structure capable of absorbing an impact load exerted on a front surface side or an upper surface side of a seat upon accident of a vehicle or an aircraft.

2. Background Art

Various seat shock absorbers have been used heretofore. For example, a striking energy generated in the event of failure in landing of an airplane is mostly absorbed by a shock absorber provided on the airplane body side. In the event of automobile collision, the resulting striking energy is absorbed by a shock absorber provided between a bumper and the chassis.

In a landing failure accident of an airplane or in an automobile collision accident, however, there is sometimes generated an impact load exceeding the impact absorbing ability of a shock absorber, and in this case too large an impact energy is applied to passengers. As the seat particularly in an airplane, in order to absorb such striking energy, there has been used a seat designed so that a special shock absorber is added to a leg portion of the seat or a diagonal member so as to absorb striking energy through a crushing load or a tensile load of the shock absorber.

In the conventional seat as described above, the leg structure such as a leg portion, a diagonal member and so on is firmly fixed by bolts and screws at connecting and fixing portions of front and rear beams, the leg portion and the diagonal member, but this is not a structure such that when the impact is applied to the leg structure, it is deformed by the impact or the striking energy can be absorbed. Accordingly, in such a case as described, the leg structure should be especially provided with parts or devices for absorbing the shock, resulting in a problem such that not only does the leg structure become complicated, but also the weight constituting the seat increases and the leg structure increases in price.

The present invention has been accomplished in view of the aforementioned problems, and it is the object thereof to provide a striking energy absorbing seat leg structure in which a special shock absorber or member is not added to the conventional leg structure but a connecting method of a diagonal member and a leg portion constituting a leg structure is changed to reduce a striking energy applied to the seat through a material characteristic, that is, a plastic deformation of the diagonal member itself, thus enhancing safety of a seat.

It is further an object of the present invention to provide a striking energy absorbing seat leg structure which can minimize an amount of deformation of a seat after shock absorption to enhance safety for passengers.

SUMMARY OF THE INVENTION

According to the present invention, there is provided a striking energy absorbing seat leg structure wherein a seat bottom and a seat back are mounted on a base frame which is mounted bridgewise between front and rear beams to constitute a seat, the structure being featured in that a diagonal member is extended bridgewise from said front beam supported by a front leg to a rearward lower portion of the seat, a rear leg for supporting the rear beam is supported and fixedly mounted on a substantially intermediate part of said diagonal member, and lower end portions of the front leg and the diagonal member are fixed to a fixed floor side rail and so on by fixing fitting members.

According to the above described structure, as shown by the phantom lines in FIG. 8, in a case, when one striking load G is applied frontwardly of the seat, the leg structure is deformed and rotated centered on the front beam while being retained on the fixed structure on the floor, with the rear side of the base frame rotated so as to be raised upwardly of the seat. Also the rear leg having an upper end connected to the rear beam as well as the diagonal member connected to the lower end of the rear leg and is flexed and deformed upwardly to absorb the striking energy.

Further, as shown by the phantom lines in FIG. 9, in another case, when a striking load G is applied from the upper part of the seat, the rear side of the base frame is downwardly rotated to the lower part centered on the front beam to transmit said load to the diagonal member through the rear leg, so as to absorb the striking energy by flexing and deforming the diagonal member downwardly.

In the above described both cases, a torsional action occurs in the front beam and said torsional action brings forth a geometrical effect with respect to the energy absorbing action of the diagonal member.

That is, the striking load applied to the leg structure is absorbed through the disappearance of mechanical energy caused by the flexing deformation of the diagonal member and the torsional action of the front beam.

DESCRIPTION OF THE PREFERRED EMBODIMENTS

A preferred embodiment of a striking energy absorbing seat leg structure according to the present invention will by described hereinafter with reference to the drawings.

Figure 1:
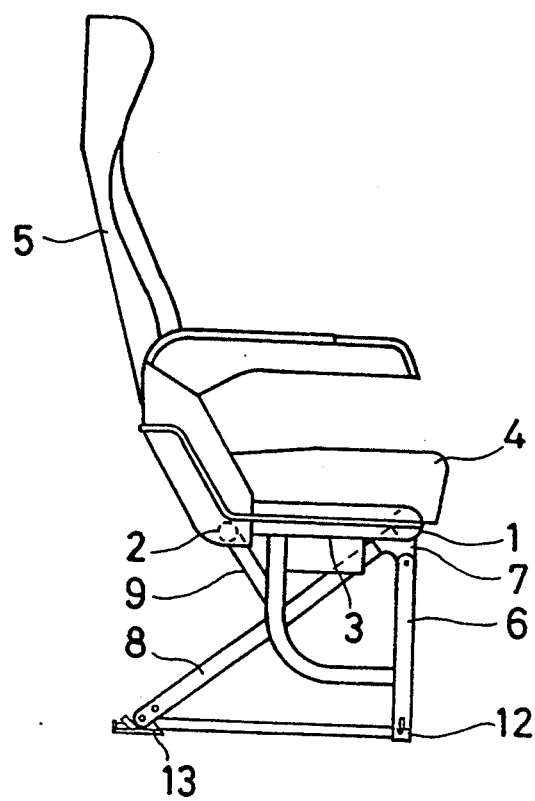
FIG. 1 is a side view of a seat constituting a striking energy absorbing seat leg structure according to the present invention.
Figure 2:
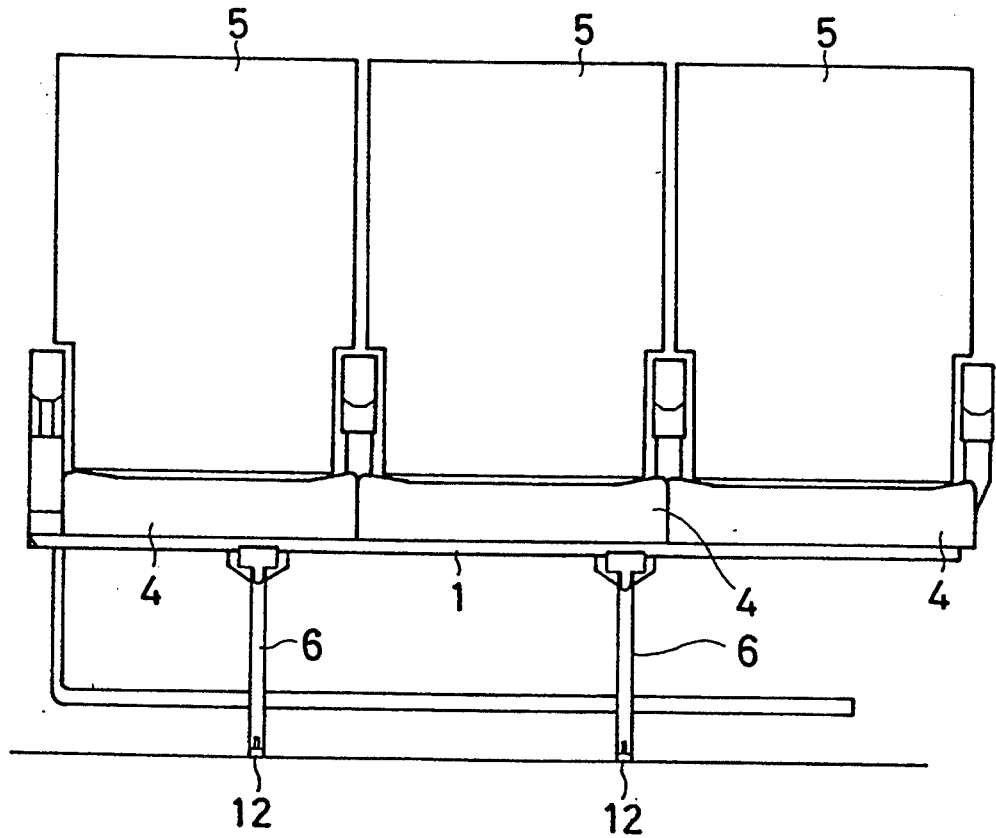
FIG. 2 is a front view of a seat constituting a striking energy absorbing seat leg structure.

FIGS. 1 and 2 show an embodiment of a triple seat for an airplane which incorporates a leg structure according to the present invention. A base frame 3 is mounted bridgewise between front and rear beams 1 and 2, and a seat bottom 4 and a seat back 5 are placed on the front and rear beams 1 and 2, and the base frame 3 to constitute a seat. The seat back 5 is supported tiltably rearwardly of the seat through a suitable reclining device (not shown).

Figure 3:
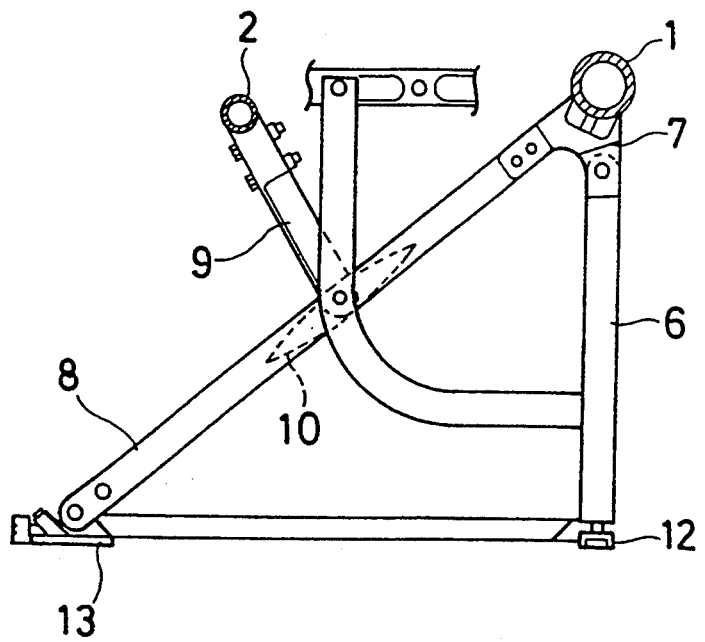
FIG. 3 is an enlarged side view of essential parts relating to a striking energy absorbing seat leg structure.
Figure 4:
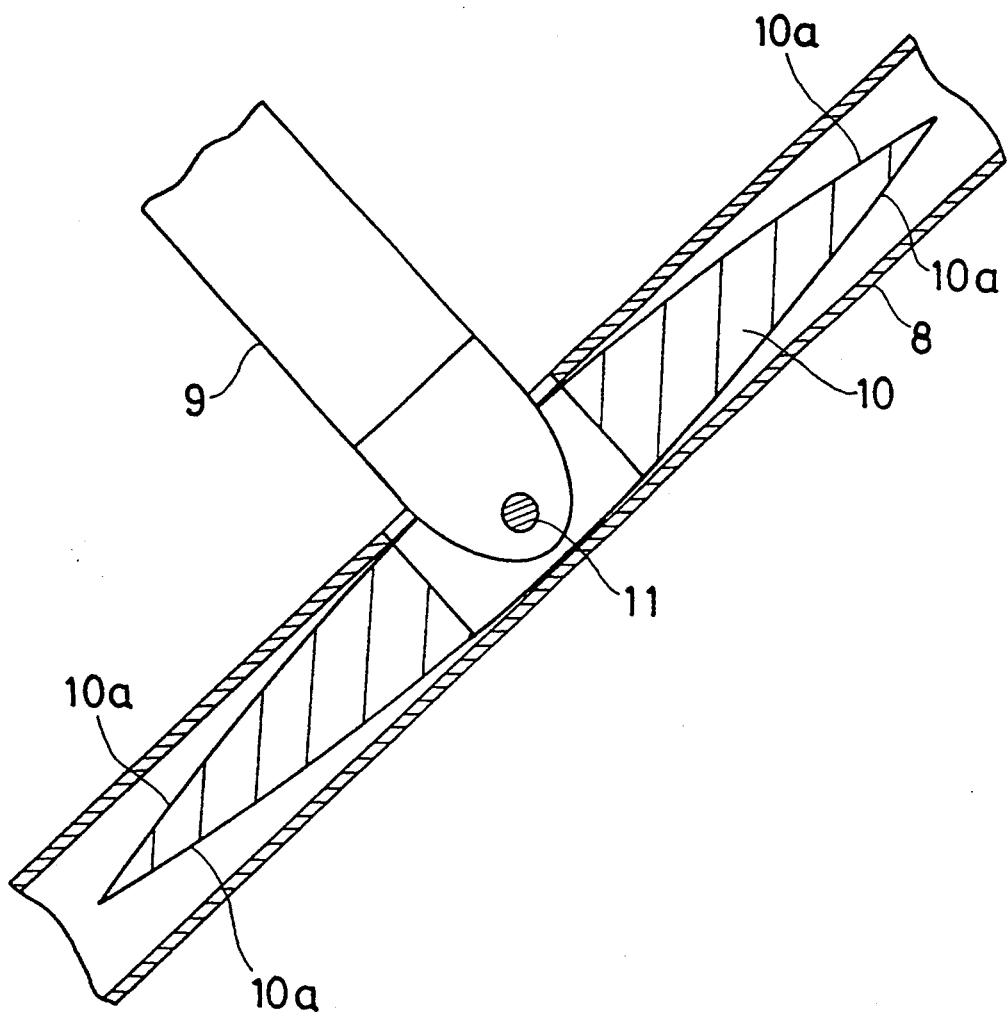
FIG. 4 is an enlarged side sectional view showing a structure of a guide member interposed in a diagonal member.
Figure 5:
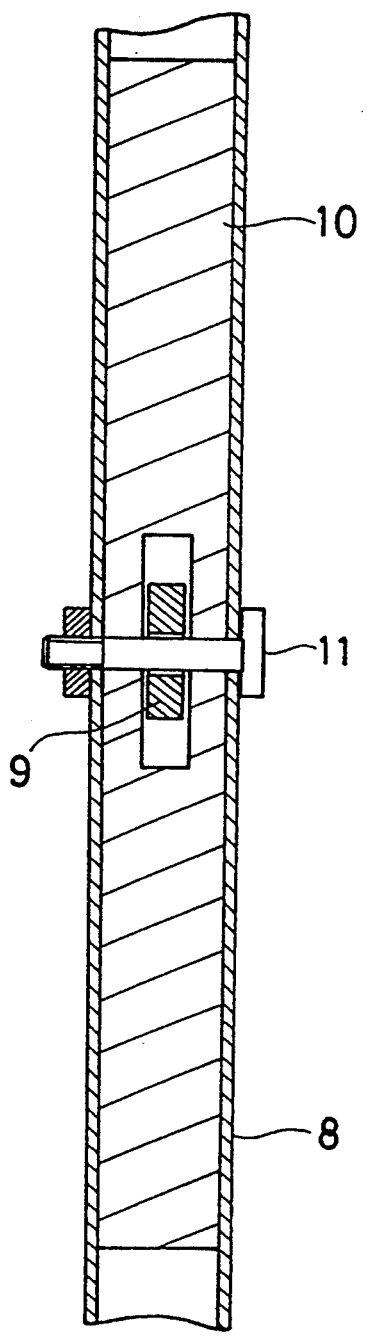
FIG. 5 is an enlarged front sectional view showing a structure of a guide member interposed in a diagonal member.

A leg structure according to the present invention is designed so that, as shown in FIG. 3, an upper end of a front leg 6 is secured to the front beam 1 through a bracket 7, an upper end of a diagonal member 8 is secured by the bracket 7 to the front beam 1, a lower end of the diagonal member 8 is extended bridgewise rearwardly of a lower portion of a seat, and the lower end can be secured to the floor. A rear leg 9 supporting the rear beam 2 has an upper end secured to the rear beam 2, and a lower end thereof is fixedly mounted on a substantially intermediate portion of the diagonal member 8, the rear beam 2 being supported on the diagonal member 8 is formed from a metal tubular body, that is, a square member or the like, and has a rigidity to such extent as not to generate a flexing deformation by a normal using load. A guide member 10 is provided at the fixedly supporting portion of the diagonal member 8 at which the rear leg 9 is fixedly mounted. This guide member 10 is formed with a guide surface 10a curved in the form of a boat on the front and rear end sides in a longitudinal direction of the diagonal member 8 as shown in FIGS. 4 and 5, the guide member 10 being fixed together with the rear leg 9 by a fixing means 11 such as a bolt which stops the diagonal member 8. When a striking load is applied by the seat to the guide member 10 whereby the diagonal member 8 is flexed and deformed, a deformation guide action along the guide surfaces 10a occurs in the flexing direction of the diagonal member 8, and a cutting and breaking preventive action for the diagonal member 8 in the deformed portion is also obtained.

While in the illustrated example, the guide member 10 has been formed into a block, it is to be noted that the guide member 10 formed of a plate material having a shape similar to that of the former may be lined and fixed to the inner end surface of the diagonal member 8.

Figure 6:
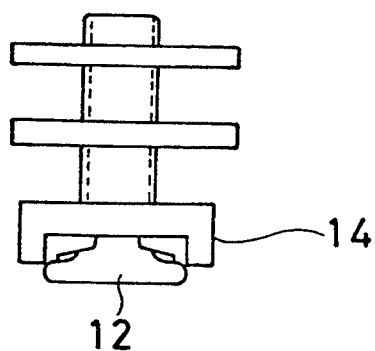
FIG. 6 is an enlarged side view of essential parts showing one example of a fixing fitting member for fixing a lower end of a front leg to a floor side rail.
Figure 7:
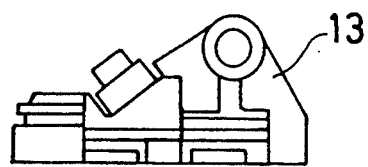
FIG. 7 is an enlarged side view of essential parts showing one example of a fixing fitting member for fixing a lower end of a diagonal member to a floor side rail.

In the striking energy absorbing seat leg structure according to the present invention, a lower end of the front leg 6 and a lower end of the diagonal member 8, which constitute the leg structure, are secured to a fixing structure 14 such as a rail on the floor side through fixing fitting members 12 and 13 as shown in FIGS. 6 and 7.

Figure 8:
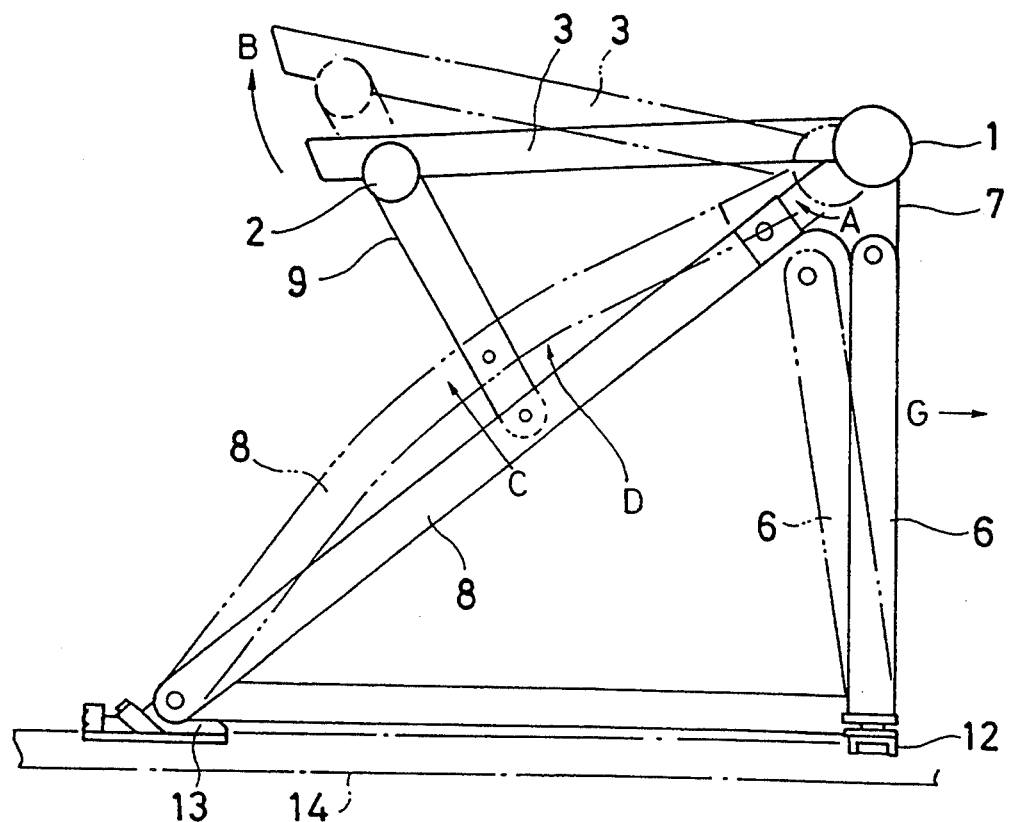
FIG. 8 is an explanatory view showing a striking energy absorbing action of a leg structure with respect to an impact applied to the front side.

In FIG. 8, according to the leg structure of the present invention, when a striking load (indicated by an arrow G) is applied frontwardly of the seat, the leg structure itself is rotated and deformed about (indicated by an arrow A) the front beam 1 while the front leg 6 and the lower end of the diagonal member 8 remain fixed onto the fixing structure 14 such as a rail, the rear portion side of the base frame 3 is simultaneously rotated (indicated by an arrow B) so as to be raised upwardly of the seat to raise (indicated by an arrow C) the rear leg 9 interposed in a substantially central portion between the rear beam 2 and the diagonal member 8, and the diagonal member 8 is upwardly flexed and deformed (indicated by an arrow D) by the tensile force to absorb striking energy.

Figure 9:
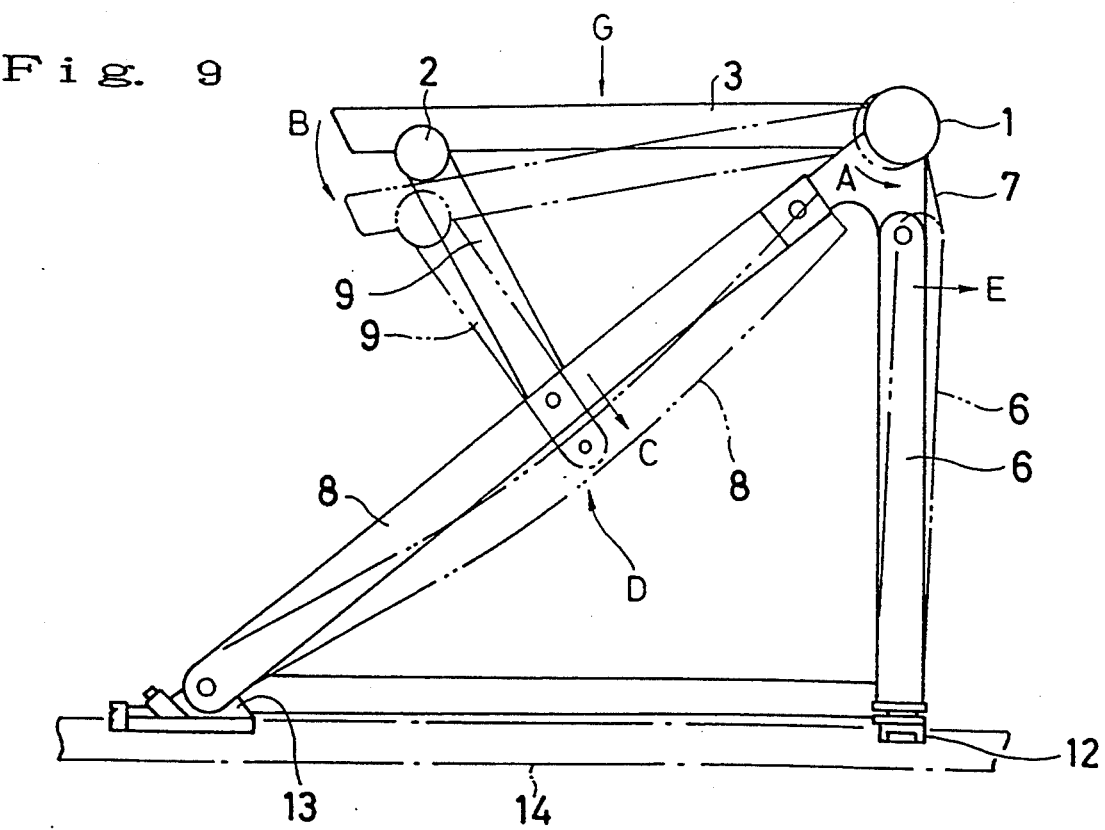
FIG. 9 is a schematic explanatory view showing a striking energy absorbing action of a leg structure with respect to an impact applied from the upper surface.

In FIG. 9, when the striking load (indicated by the arrow G) is applied from above the seat, the rear portion side of the base frame is rotated downwardly (indicated by the arrow B) about (arrow A) the front beam 1, the load is transmitted to the diagonal member 8 causing it to flex and deform (indicated by the arrow D), and the striking energy is absorbed. At that time, the front leg 6 and the upper end side of the diagonal member 8 of the leg structure are forced forwardly (indicated by an arrow E) about the front beam 1.

In either case described above, a torsional action is generated in the front beam 1, the torsional action bringing forth the geometrical shock absorbing action together with the energy absorbing action of the diagonal member 8. That is, in the striking energy absorbing seat leg structure, the striking load (G) applied to the leg structure is absorbed by the flexing deformation of the diagonal member 8 and the disappearance of mechanical energy caused by the torsional action of the front beam 1.

The striking energy absorbing seat leg structure according to the present invention is constructed as described above. Therefore, a shock absorbing function resulting from a mechanical energy absorbing action caused by flexing and deformation of the diagonal member is imparted to the diagonal member as reinforcing member of the leg structure without increasing and decreasing or changing constituent members in a conventional leg structure, to enable provision of an efficient shock absorbing seat leg structure. In addition, an increase of weight constituting the seat, and since the leg structure is almost the same as that of prior art, it can be simply repaired and adjusted. As just mentioned, these are extremely significant effects.

Specifically the striking energy absorbing seat leg structure according to the present invention is provided as a seat leg structure for passengers in an aircraft, an automobile and a railway vehicle. In the event when an airplane has an accident upon landing, or a collision accident of an automobile or a railway vehicle occurs, the structure absorbs the generated striking energy to secure safety of passengers.

We claim:

1. A striking energy absorbing seat leg structure for a seat in which a seat bottom and a seat back are mounted on a base frame mounted bridgewise between front and rear beams, comprising: a generally vertically extending front leg having an upper end connected to said front beam and a lower end connected to a floor side rail, a continuous tubular diagonal member having an upper end connected to said front beam and a lower end connected to said floor side rail rearward of said rear beam, a rear leg having an upper end connected to said rear beam, and a guide member received within said diagonal member at a position intermediate said upper and lower ends of said diagonal member, a lower end of said rear leg being connected to said guide member, wherein, when a striking load is applied in a forward direction of said seat, said base frame pivots about said front leg so as to raise said rear beam, pulling said rear leg upwardly and thereby flexing and deforming said diagonal member in an upward direction to absorb striking energy, while said front leg undergoes a torsional action to absorb a shock force, and when a striking load is applied in a rearward direction of said seat, said base frame pivots about said front leg so as to lower said rear beam, pushing said rear leg downwardly and thereby flexing and deforming said diagonal member in a downward direction to absorb striking energy, while said front leg undergoes a torsional action to absorb a shock force.

2. The striking energy absorbing seat leg structure for a seat of claim 1, wherein said guide member is a block-like member.

3. The striking energy absorbing seat leg structure for a seat of claim 1, further comprising a bolt for securing said lower end of said rear leg to said guide member.

4. The striking energy absorbing seat leg structure for a seat of claim 3, wherein said guide member is generally boat shaped in forward and rearward directions from said bolt.

5. The striking energy absorbing seat leg structure for a seat of claim 1, further comprising a bracket for connecting said upper end of said front leg and said diagonal member to said front beam.

* * * * *